Patented Aug. 8, 1950

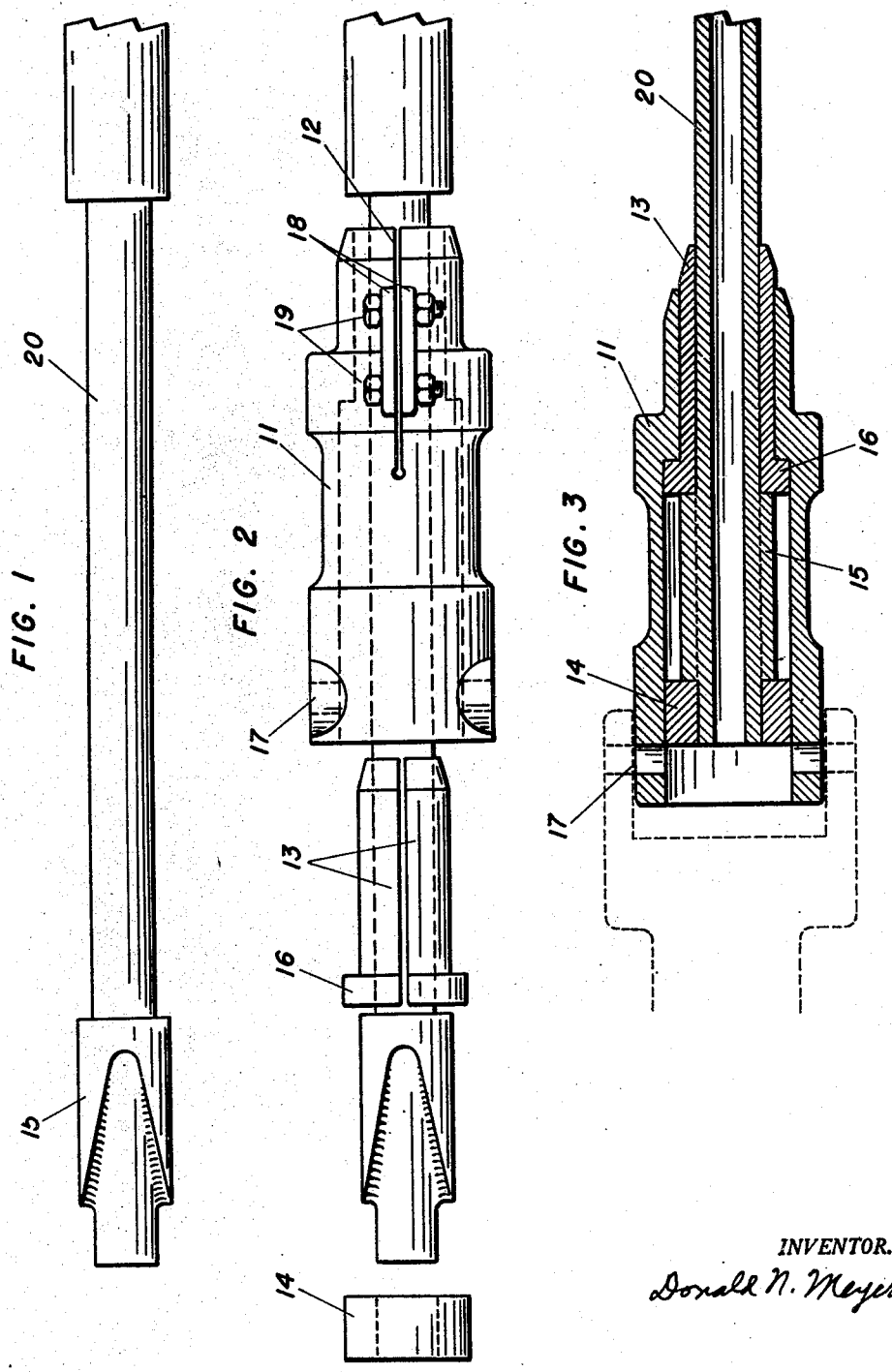

2,518,243

UNITED STATES PATENT OFFICE 2,518,243

LIFTING ROTOR BLADE ATTACHMENT

Donald N. Meyers, Philadelphia, Pa., assignor, by mesne assignments, to Piasecki Helicopter Corporation, Morton, Pa., a corporation of Pennsylvania Application May 29, 1947, Serial No. 751,309

3 Claims. (Cl. 170—160.6)

This invention relates to rotary wing aircraft and more particularly to improvements in root-end fittings for rotary wing blades.

The principal object of this invention is to provide a root-end fitting that is light in weight and permits quick adjustment of the angle of incidence of the blade.

Another object of the invention is to provide a root-end that may be quickly and easily attached to the blade, and detached therefrom.

Another object of this invention is to provide a root-end fitting that will transmit the centrifugal loads of a blade to the hub in an efficient manner.

Other objects and advantages will become apparent in the following specification when read in conjunction with the accompanying drawings in which:

Figure 1 is an elevational view of a root-end of a blade without the root-end fitting.

Figure 2 is an elevational view of a root-end of a blade with the root-end fitting partly assembled thereon.

Figure 3 is a cross-sectional view of a root-end of a blade with the root-end fitting completely assembled thereon.

The root-end fitting is comprised of a housing 11 having a split portion 12 at the outer end thereof and a split bushing 13 adapted to fit into the outer portion of the housing 11, the length of the split bushing exceeding twice the diameter of that portion of the spar which it engages as shown in Figure 3 of the drawings. A spacer member 14 is positioned between the inner end of the housing 11 and the spacer 20. At the inner end of the blade spar 20 a sleeve 15 is welded thereto to form an abutment. This abutment can also be formed by a machine process if desired. Housing 11 has the outer portion thereof bored to slide over the sleeve 15 and bushing 13. The inner portion is bored to a larger diameter to receive the shoulder portion 16 of the split bushing 13 and the spacer 14. In the inner portion of the housing 11 is a hole 17 drilled therethrough to receive the drag or flapping hinge pin carried by the hub portion of the rotor not shown.

In assembling the root-end fitting the housing 11 is first slipped over sleeve 15 and moved out on the blade spar 20 to the position shown in Figure 2. Next, the split bushing 13 is fitted on to the spar adjacent to the sleeve 15 after which the spacer member 14 is slipped on the inner end of the blade spar. With the parts thus arranged the housing 11 is moved back over the split bushing 13 and the spacer 14 as shown in Figure 3. The split portion of the housing 11 is provided with two clamping ears 18 which are drilled to receive clamping bolts 19.

By referring to Figure 3 of the drawings it can be seen that the centrifugal force acting on the blade is transmitted to sleeve 15 which abuts against the split bushing 13 through which the forces are transmitted to the housing 11. It will be noted that the spar 20 is well reinforced by the sleeve 15 and the bushing 13 at its root-end where high bending forces might be expected.

Adjustment in the angle of incidence of the blade can easily be made by loosening the clamping bolts 19 which will permit the spar 20 to be rotated relative to the housing 11 until the proper setting is obtained at which time the clamping bolts 19 are tightened. This construction allows blades to be changed quickly and easily and permits blades to be exchanged without the use of new root-end fittings for each blade, as has been necessary in earlier blade designs.

While the foregoing is a description of the preferred embodiment of my invention, it is to be understood that various other forms and arrangements could be made without departing from the scope and spirit of my invention as disclosed herein and claimed in the following claims.

I claim:

1. Blade attachment means for aircraft sustaining rotors comprising in combination, a tubular blade spar, an abutment on the inner portion of said spar, said abutment being of greater diameter than the spar, a split bushing circumferentially engaging said spar outboard of said abutment, the inner end of said bushing being in axial engagement with the outer end of said abutment, a shoulder formed on the inner portion of said bushing, the outer portion of said bushing comprising a shank, the length of said shank being greater than twice the diameter of that portion of the spar it engages, a housing provided with attaching means, the outer portion of said housing being bored to slidably engage the shank of said bushing, the inner portion of the housing being bored for sliding engagement of the shoulder formed on said bushing and to form with the first named bore an abutment for axial engagement with the shoulder of said bushing, the outer portion of said housing being split and provided with means to clamp the housing and bushing on the spar.

2. A blade attachment as set forth in claim 1 and including a collar positioned between the inner end of said housing and the inner end of said spar.

3. A blade attachment as set forth in claim 1 and in which the clamping means is disposed inwardly from the end of said housing.

DONALD N. MEYERS.

REFERENCES CITED

The following references are of record in the file of this patent:

UNITED STATES PATENTS

| Number | Name | Date |
|---|---|---|
| 1,875,606 | Houston | Sept. 6, 1932 |
| 1,885,487 | Squires | Nov. 1, 1932 |
| 1,995,460 | Pecker | Mar. 26, 1935 |
| 2,047,776 | Hafner | July 14, 1936 |
| 2,169,849 | Pitcairn | Aug. 15, 1939 |

FOREIGN PATENTS

| Number | Country | Date |
|---|---|---|
| 394,799 | Great Britain | July 6, 1933 |